US008861589B2

(12) United States Patent
Wyman

(10) Patent No.: US 8,861,589 B2
(45) Date of Patent: Oct. 14, 2014

(54) DETECTION AND PHASE LOCK OF PULL-DOWN VIDEO

(75) Inventor: Richard Hayden Wyman, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 2765 days.

(21) Appl. No.: 10/871,758

(22) Filed: Jun. 17, 2004

(65) Prior Publication Data

US 2005/0168652 A1    Aug. 4, 2005

Related U.S. Application Data

(60) Provisional application No. 60/540,393, filed on Jan. 30, 2004.

(51) Int. Cl.
 H04N 7/12    (2006.01)
 H04N 7/01    (2006.01)

(52) U.S. Cl.
 CPC ................. *H04N 7/0115* (2013.01)
 USPC .................................... 375/240.01

(58) Field of Classification Search
 USPC ........... 375/240.01, 240.26; 348/97; 382/190
 IPC ...................................... H04N 7/12
 See application file for complete search history.

(56) References Cited

U.S. PATENT DOCUMENTS

| | | |
|---|---|---|
| 4,400,719 A | 8/1983 | Powers |
| 5,337,154 A | 8/1994 | Dorricott et al. |
| 5,428,399 A | 6/1995 | Robinson et al. |
| 5,457,499 A | 10/1995 | Lim |
| 5,691,771 A * | 11/1997 | Oishi et al. ............... 348/97 |
| 5,861,924 A | 1/1999 | Pan et al. |
| 5,982,444 A | 11/1999 | Kato et al. |
| 6,055,018 A | 4/2000 | Swan |
| 6,167,088 A | 12/2000 | Sethuraman |
| 6,262,773 B1 | 7/2001 | Westerman |
| 6,269,484 B1 | 7/2001 | Simsic et al. |
| 6,317,165 B1 | 11/2001 | Balram et al. |
| 6,389,155 B2 * | 5/2002 | Funayama et al. ............ 382/190 |
| 6,407,775 B1 | 6/2002 | Frink et al. |
| 6,459,455 B1 | 10/2002 | Jiang et al. |
| 6,509,933 B1 | 1/2003 | Honda |
| 6,563,550 B1 | 5/2003 | Kahn et al. |
| 6,603,815 B2 | 8/2003 | Suzuki et al. |
| 6,614,484 B1 | 9/2003 | Lim et al. |
| 6,680,752 B1 | 1/2004 | Callway et al. |
| 6,970,206 B1 | 11/2005 | Swan et al. |
| 7,020,197 B2 | 3/2006 | Tanase et al. |
| 7,042,512 B2 | 5/2006 | Yang et al. |

(Continued)

*Primary Examiner* — Young Lee
(74) *Attorney, Agent, or Firm* — Foley & Lardner LLP

(57) ABSTRACT

Certain aspects of the invention may comprise a plurality of algorithms and architectures capable of performing 3:2 pull-down cadence detection and reverse 3:2 pull-down of a received video signal. In one embodiment, a method of identifying a pull-down field in a pull-down video stream comprises generating one or more temporally sequential variances, correlating the one or more temporally sequential variances to one or more temporal variance patterns associated with the pull-down video, wherein each of the one or more temporal variance patterns is associated with one or more unique field phases. In one embodiment, a system for identifying a pull-down field in a pull-down video stream comprises a memory, a first circuitry capable of computing a first equation, a second circuitry capable of computing a second equation, a third correlation circuitry, one or more counters, and a fourth circuitry capable of selecting a field phase.

69 Claims, 9 Drawing Sheets

(56) References Cited

U.S. PATENT DOCUMENTS

| | | |
|---|---|---|
| 7,075,581 B1 | 7/2006 | Ozgen et al. |
| 7,129,990 B2 | 10/2006 | Wredenhagen et al. |
| 7,170,561 B2 | 1/2007 | Winger et al. |
| 7,177,470 B2 | 2/2007 | Jasinschi et al. |
| 7,202,907 B2 | 4/2007 | Chow |
| 7,375,760 B2 | 5/2008 | Kempf et al. |
| 2002/0171759 A1 | 11/2002 | Handjojo et al. |
| 2003/0156301 A1 | 8/2003 | Kempf et al. |
| 2003/0195977 A1 * | 10/2003 | Liu et al. .................. 709/231 |
| 2004/0012673 A1 | 1/2004 | Tanase et al. |
| 2005/0018087 A1 | 1/2005 | Lee |
| 2005/0030422 A1 | 2/2005 | Leone et al. |
| 2005/0057646 A1 | 3/2005 | Cho et al. |

\* cited by examiner

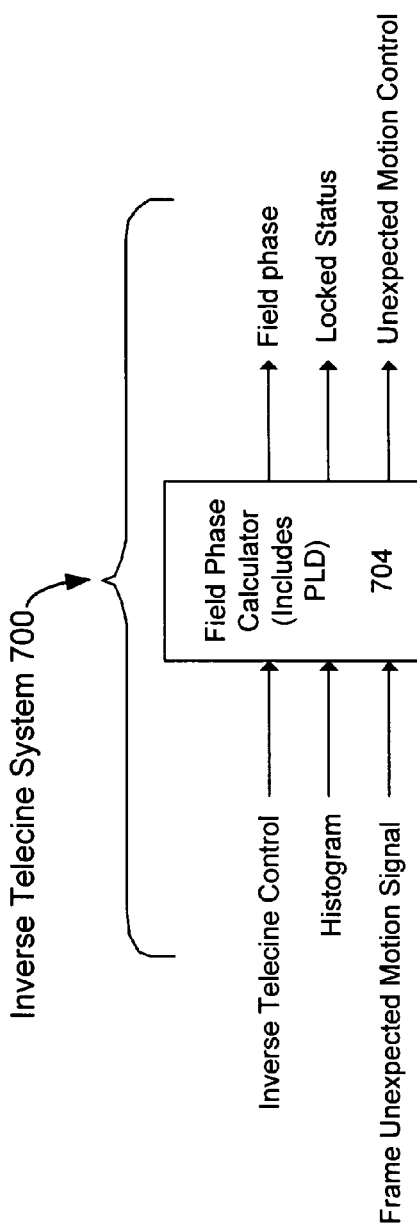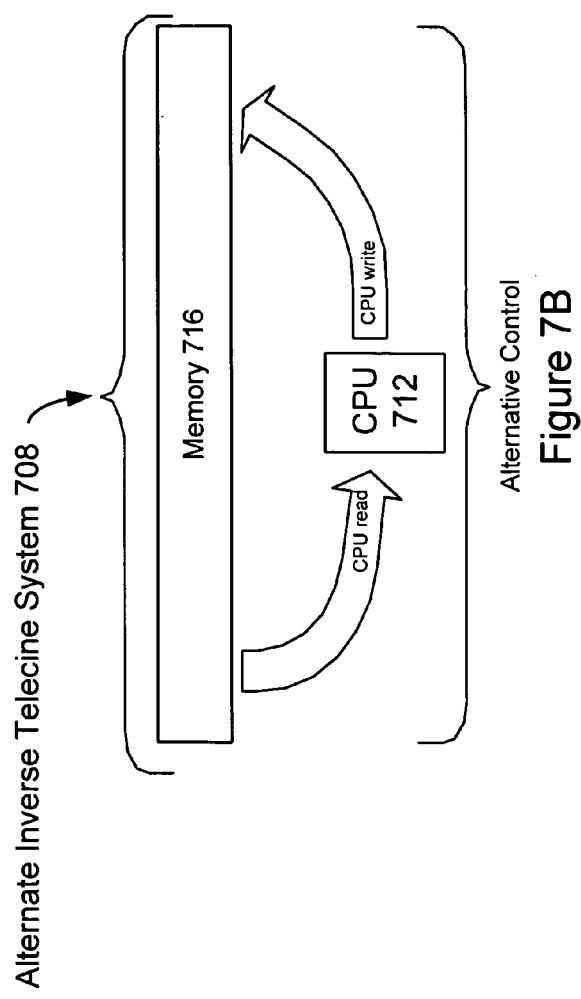
Figure 7A
Figure 7B

DETECTION AND PHASE LOCK OF PULL-DOWN VIDEO

CROSS-REFERENCE TO RELATED APPLICATIONS/INCORPORATION BY REFERENCE

This application makes reference to, claims priority to, and claims benefit from U.S. Provisional Patent Application Ser. No. 60/540,393 entitled "DETECTION AND PHASE LOCK OF 3:2 PULL-DOWN VIDEO" filed on Jan. 30, 2004, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In order to properly display video onto a television system that was originally recorded using film, the video must be converted into an appropriate format. Movies are generated using conventional 35 mm and/or 70 mm film; the film is shot at 24 frames per second and may be subsequently up-converted to a display rate of 48 frames per second in order to minimize visible flicker. A typical television system utilizes video that is composed of interlaced video comprising even and odd horizontal scan lines. The effective television display rate is approximately 60 fields per second or 30 frames per second. One method of transcoding the video from a 48 frame/second rate to that of a 60 field/second rate occurs by incorporating a duplicate field to every four fields of video. This technique may be referred to as 3:2 pull-down, and the duplicate or repeated field may be referred to as a pull-down field.

While the 3:2 pull-down process restores the proper speed of the film on video, it generates a number of issues when a typical television system is used to display the 3:2 pull-down video. For example, two sequential video frames within every five video frame sequence contain images from different film frames. If there is any movement or motion of the image, the video processed by a typical television system will be visually distorted.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in a system and method to more effectively detect and perform a reverse 3:2 pull-down for a 3:2 pull-down video signal. Aspects of the present invention provide a system and method to lock onto the field phase of a received video signal.

In one embodiment, a method of identifying a pull-down field in a 3:2 pull-down video stream comprises generating one or more temporally sequential variances, correlating the one or more temporally sequential variances to one or more temporal variance patterns associated with the 3:2 pull-down video, wherein each of the one or more temporal variance patterns is associated with one or more unique field phases. The method further comprises generating one or more correlation coefficients associated with each of the one or more temporal variance patterns, assessing whether the one or more correlation coefficients exceeds a first threshold value, incrementing one or more counters associated with the one or more correlation coefficients if the one or more correlation coefficients exceeds the first threshold value, assessing whether the one or more correlation coefficients is less than a second threshold value, decrementing the one or more counters associated with the one or more correlation coefficients if the one or more correlation coefficients is less than the second threshold value, selecting the one or more unique field phases as a repeat field phase, and identifying the pull-down field associated with the repeat field phase.

In one embodiment, a method of measuring the unexpected motion between two fields comprises determining absolute differences of corresponding pixels between the two fields, generating a histogram using the absolute differences, and computing the unexpected motion.

In one embodiment, a method of locating a pull-down field in a 3:2 pull-down video stream comprises determining absolute differences of corresponding pixels between one or more pairs of fields, the one or more pairs of fields temporally located two field periods apart within the 3:2 pull-down video stream, generating one or more histograms using the absolute differences, computing the one or more temporally sequential variances, wherein each of the one or more sequential variances is computed from a histogram of the one or more histograms, wherein the histogram is generated from a corresponding pair of fields of the one or more pairs of fields. The method further comprises correlating the one or more temporally sequential variances to one or more temporal variance patterns, and generating one or more correlation coefficients associated with each of the one or more temporal variance patterns.

In one embodiment, a system for identifying a pull-down field in a pull-down video stream comprises a memory capable of storing data, a first circuitry capable of computing a first numerical equation, a second circuitry capable of computing a second numerical equation, a third circuitry capable of correlating one or more variances with one or more variance patterns, one or more counters capable of measuring the degree of correlation of the one or more variances with the one or more variance patterns, and a fourth circuitry capable of selecting a field phase based on the counts of the one or more counters.

In one embodiment a system for identifying a pull-down field comprises a central processing unit and a memory, wherein the central processing unit is capable of executing a set of instructions. The set of instructions is designed to effectuate detection and lock of a field phase such that reverse pull-down of the pull-down video is accomplished.

These and other advantages, aspects, and novel features of the present invention, as well as details of illustrated embodiments thereof, will be more fully understood from the following description and drawings.

BRIEF DESCRIPTION OF THE DRAWINGS

FIG. 7A is a block diagram that comprises an inverse telecine system 700 in accordance with an embodiment of the invention.

FIG. 7B is a block diagram that comprises an alternate inverse telecine system 708, in accordance with an embodiment of the invention.

DETAILED DESCRIPTION OF THE INVENTION

Certain aspects of the invention may comprise a plurality of algorithms and architectures capable of performing 3:2 pull-down cadence detection and reverse 3:2 pull-down of a received video signal. In order to perform the reverse pull-down, aspects of the present invention provide a system and method to lock onto the field phase of the received video signal. The algorithms and architectures that perform the reverse 3:2 pull-down may be adapted to acquire interlaced video fields from one of a plurality of video sources in the video network and to convert the acquired interlaced video fields into progressive frames, at double the display rate, in a visually pleasing manner. In one embodiment, the received video signal comprises an interlaced 3:2 pull-down process used for NTSC video. The field phase of the video signal is used to perform a reverse 3:2 pull-down on interlaced 3:2 video. The reverse 3:2 pull-down facilitates the re-generation of original source film frames that may be utilized in generating de-interlaced progressive video. In one embodiment, the system receives 720×480i (NTSC format) and outputs 720×480p. In another embodiment, the system receives 720×480i (PAL-M format) and outputs 720×480p. Hereinafter, the system that detects a pull-down field, performs a reverse pull-down, and generates a field phase lock will be termed a 3:2 phase lock detector (PLD).

Figure 1:
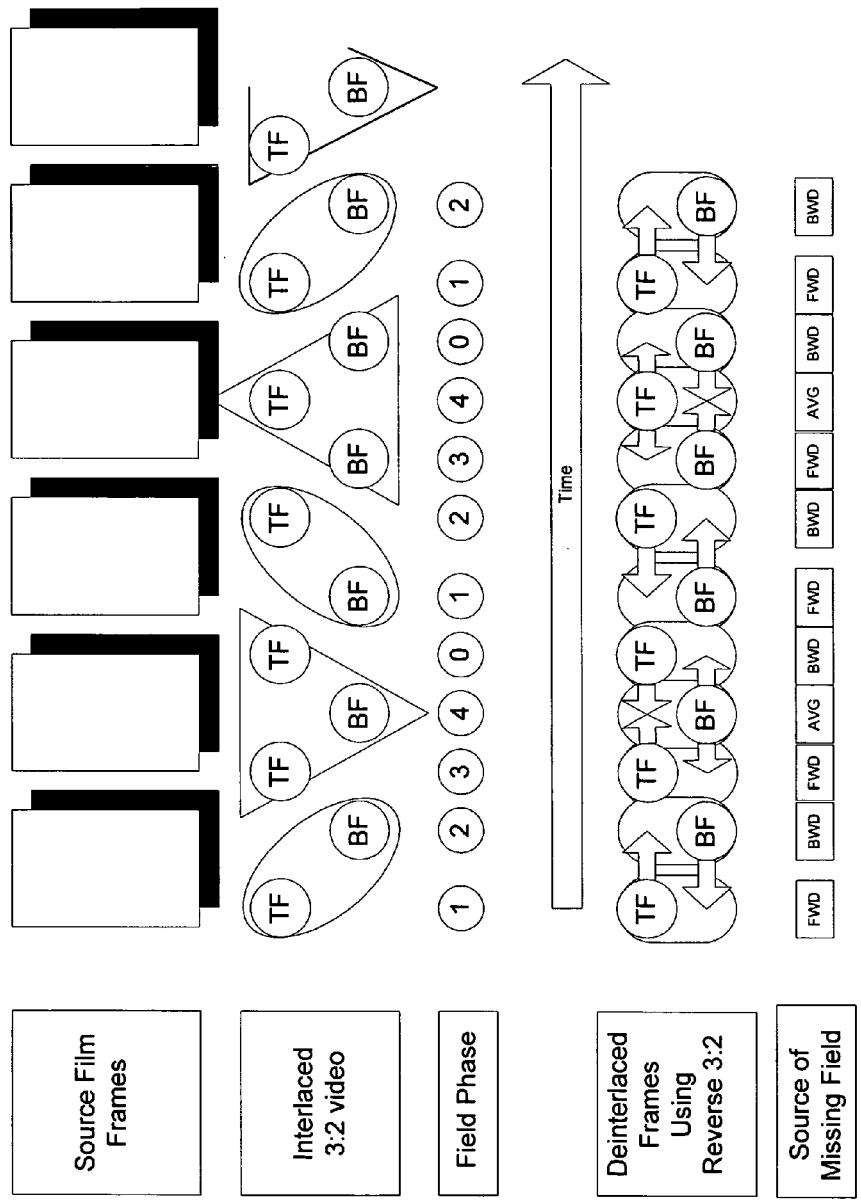
FIG. 1 is a block diagram illustrating the operation of performing reverse 3:2 pull-down when an interlaced 3:2 pull-down video is received in accordance with an embodiment of the invention.

FIG. 1 is a block diagram illustrating the operation of performing reverse 3:2 pull-down when an interlaced 3:2 pull-down video is received in accordance with an embodiment of the invention. One or more source film frames are shown in the top portion of FIG. 1. Two source film frames captured at a rate of 24 frames per second are used to generate 5 fields of video at a rate of 60 fields per second. Thus, the interlaced 3:2 video comprises a sequence of top and bottom fields (labeled TF and BF) running at 60 fields per second. As shown, the first source film frame is represented by two fields while the second source film frame is represented by three fields. Since the interlaced video has a periodicity of 5 fields, the field phase may be represented by a modulo 5 counter, as shown. Subsequently, the interlaced video is de-interlaced using reverse 3:2 pull-down as illustrated in the fourth row of FIG. 1. The directional arrows provide an indication of what source film frame is to be used to generate the missing field in order to display de-interlaced progressive video at double the display rate. The last row of FIG. 1 illustrates the source of the missing field or direction of the weave (either forwards, backwards, or both) utilized in order to correctly generate the source film frame used when displaying de-interlaced progressive video. In reverse 3:2 pull-down operation, the location of the pull-down field within the video stream is determined. As a consequence of determining the temporal location of the pull-down field, the current field phase may be easily extrapolated by way of the known 3:2 video cadence, as illustrated in FIG. 1. In this embodiment, the pull-down field is defined as field phase 0.

Figure 2:
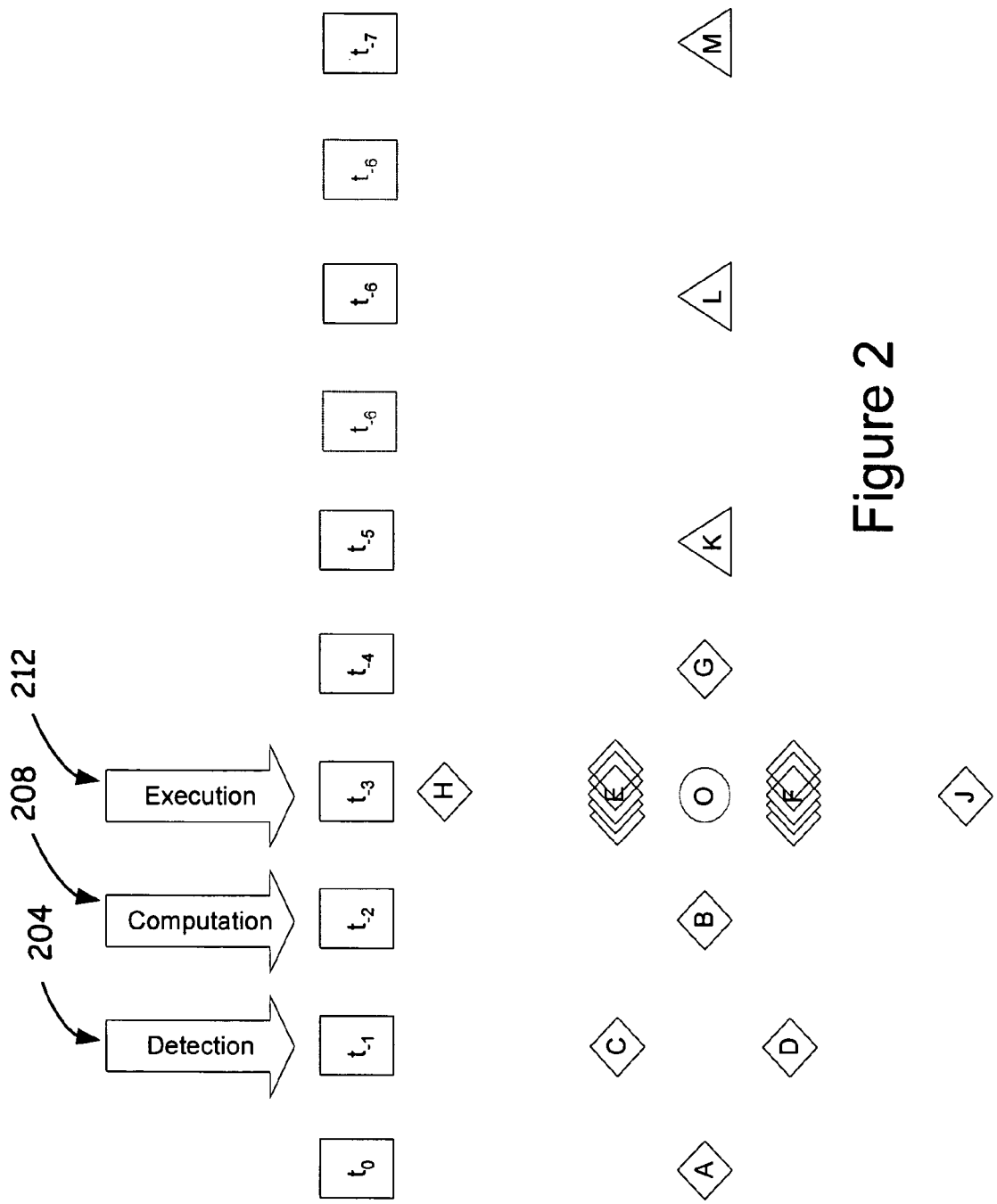
FIG. 2 illustrates an exemplary pixel constellation that is used in performing reverse 3:2 pull-down in accordance with an embodiment of the invention. The embodiment of FIG. 2 also illustrates a temporal sequence of one or more functional operations, that are effectively implemented by way of pipelined processing, in accordance with an embodiment of the invention.

FIG. 2 illustrates an exemplary pixel constellation that is used in performing reverse 3:2 pull-down in accordance with an embodiment of the invention. The embodiment of FIG. 2 also illustrates a temporal sequence of one or more functional operations, that are effectively implemented by way of pipelined processing, in accordance with an embodiment of the invention. The pixel constellation provides an exemplary set of pixels, used by the reverse 3:2 pull-down process, for computing or approximating a pixel in a desired location. In reference to FIG. 2, the abscissa is represented by way of discrete indicators $t_0, t_{-1}, t_{-2}, t_{-3}$, etc. In reference to the lower portion of FIG. 2, the lettered elements correspond to a pixel constellation. The pixel constellation varies temporally along the abscissa and spatially along the ordinate. Further, the pixel constellation is defined in terms of a third coordinate axis that provides a second spatial dimension—this is illustrated by pixels E and F in FIG. 2. In one embodiment, the two spatial axes may comprise vertical and horizontal axes in a two dimensional spatial plane. In this embodiment, $E_0$ and $F_0$ correspond to the same horizontal position as the other pixels shown in FIG. 2 (e.g., A, B, C, D, H, G, and J).

Aspects of the invention provide three functional operations that are used in order to perform the reverse 3:2 pull-down. The first functional operation gathers statistics related to the fields of the interlaced video. Then, in the second functional operation, those gathered statistics are used to generate a phase lock on the received 3:2 pattern, in which the current phase field is identified. Finally, at the third functional operation, the identified current phase field is used to reverse the 3:2 pull-down into de-interlaced frames. Referring to FIG. 2, the three functional operations are termed detection, computation, and execution. In the first functional timeframe $(t_{-1})$ 204, the aforementioned statistics are collected. In the second functional timeframe $(t_{-2})$ 208, a CPU (central processing unit) or a reverse 3:2 pull-down circuitry performs the required calculations to determine the current field phase. Before the end of the second functional timeframe, the configuration is readied so that at the third functional timeframe $(t_{-3})$ 212, a correct selection for each absent pixel may be made, by way of the reverse 3:2 weave process. At one or more points in time, an assessment using the three functional operations may be made. In one embodiment, a 3:2 phase lock detector (PLD) receives interlaced 3:2 pull-down video (e.g. NTSC or PAL format) and processes the video field by field. In order to implement reverse 3:2 pull-down, the PLD must assess whether the input was originally sourced from film.

Figure 3:
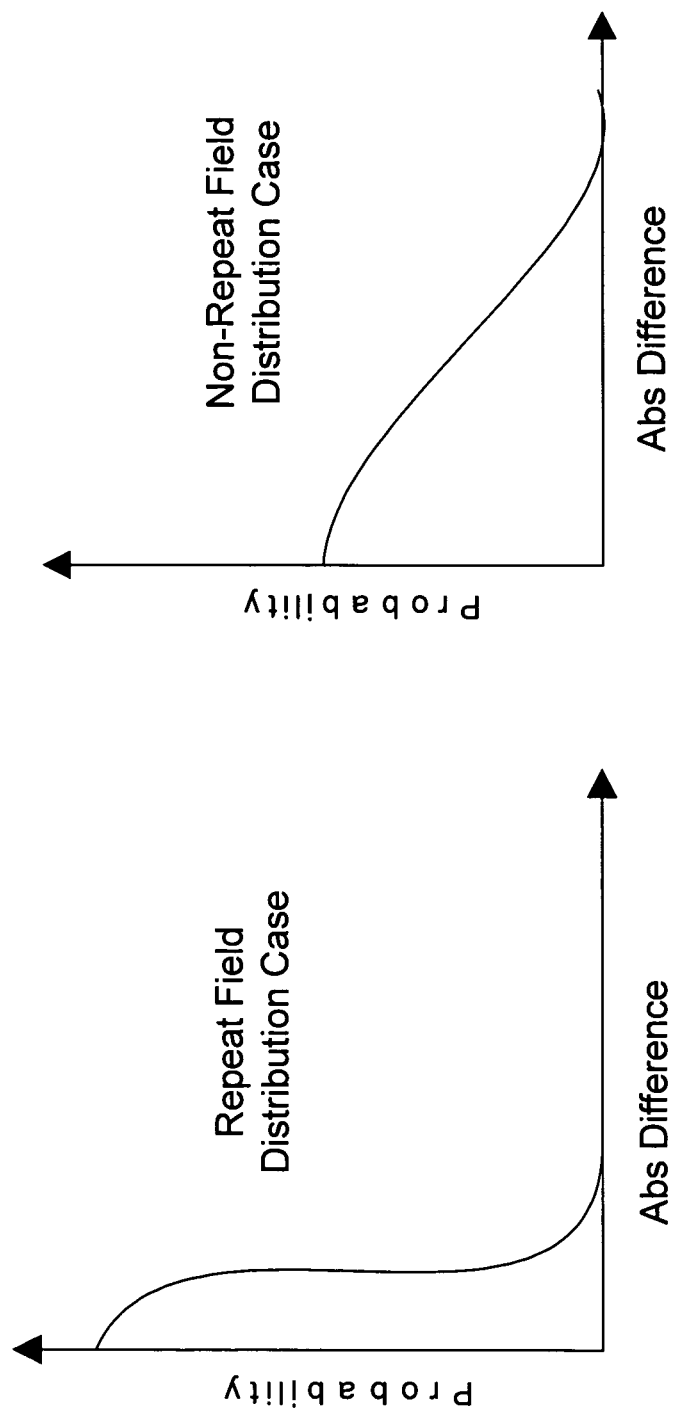
FIG. 3A illustrates a probability density function of the absolute difference between repeat fields in accordance with an embodiment of the invention.
FIG. 3B illustrates a probability density function of the absolute differences between non-repeat fields in accordance with an embodiment of the invention.

Once this is determined, the current field phase, as described in reference to FIG. 1, must be determined so that the reverse 3:2 weave may be performed. The PLD determines whether the received video is, in fact, interlaced 3:2 video by analyzing the correlation characteristics of one or more pixel pairs. In one embodiment, the PLD computes variances over time with respect to a number of repeat fields of the interlaced 3:2 video. As previously illustrated in FIG. 1, a repeated field is contained within a triplet (represented by triangular areas of the interlaced 3:2 video row of FIG. 1), or three fields corresponding to a particular source film frame. The one or more repeated fields will either originate from a top field or from a bottom field of the interlaced 3:2 video. Further, the repeated fields occur exactly t=2 time units between themselves (i.e., the two fields or output frames are exactly two time units apart). As a consequence, a histogram of the absolute differences between corresponding pixels originating from two fields that are separated by two time units may be calculated. Referring back to FIG. 2, the absolute differences between corresponding pixels for a first field sampled at $t_1 = -1$ (time=-1) and for a second field sampled at $t_{-3} = -3$ (time=-3) may be calculated. Of course, the number of absolute differences calculated between a large number of pixel pairs provides a more accurate value of the variance. For example, an entire field of pixel pairs may be used in the calculation of absolute values. In one embodiment, the probability density function of the absolute differences of pixels between repeat fields may be represented by FIG. 3A, in accordance with an embodiment of the invention. On the other hand, the probability density function of the absolute differences of pixels between non-repeat fields may be represented by FIG. 3B, in accordance with an embodiment of the invention.

For example, referring back to FIG. 2, the absolute difference of each pixel may be calculated by the following equation when the current output frame is top field originated:

$$Absdiff = abs(C - E_0)$$

Likewise, the absolute difference of each pixel may be calculated by the following equation when the current output frame is bottom field originated:

$$Absdiff = abs(D - F_0)$$

In one embodiment, the absolute differences are collected in a histogram table that is used to approximate the probability distribution. The histogram table may be implemented using one or more registers. In one embodiment, the histogram may employ any number of bins. Each of the bins count the number of occurrences in which an absolute difference falls within a range of values. In one embodiment, the ranges of the one or more bins may vary. In one embodiment, the number of occurrences in one or more bins may be implemented using one or more registers. In one embodiment, the histogram may employ up to as many as 64 bins. In one embodiment, the histogram table is characterized by 64 bins, in which each bin is 4 units wide. For example, $Bin_0$ may collect absolute differences equal to 0 through 3, while $bin_1$ collects absolute difference values equal to 4 through 7, etc. The histogram table may be double buffered so that the contents of the table can be read by way of either software executed by a central processing unit or by way of a reverse 3:2 pull-down circuitry while statistics for the next field is being collected. A value for the variance of the distribution is approximated using the following formula:

$$sigma = bin_1 + 2(bin_2 + bin_3) + 4(bin_4 + bin_5 + bin_6 + bin_7) + 8\sum_{n=8}^{63} bin_n$$

For example, $bin_2$ gives the number of absolute differences that were between the values 8 and 11 inclusive, etc. Note that $bin_0$ (values between 0 and 3) is not used in this formula. As a consequence, the value of sigma may be small if the absolute differences between pixel pairs generally fall into $bin_0$.

In another embodiment, the histogram table comprises 5 bins, such that the implementation, using one or more registers, is more cost effective, compared with using 64 bins. For example, the histogram bins are characterized by the following equations:

$$histogram_0 = histogram_0 + 1 \text{ when } 4 \leq absdiff < 8$$

$$histogram_1 = histogram_1 + 1 \text{ when } 8 \leq absdiff < 16$$

$$histogram_2 = histogram_2 + 1 \text{ when } 16 \leq absdiff < 32$$

$$histogram_3 = histogram_3 + 1 \text{ when } 32 \leq absdiff < 64$$

$$histogram_4 = histogram_4 + 1 \text{ when } 64 \leq absdiff \leq 255$$

Each of the preceding histogram bins ($histogram_0, \ldots, histogram_4$) may be implemented using a register, for example. The calculation of sigma and a repeat field motion value (repf_motion) may be accomplished using the following equations:

$$sigma = histogram_0 + 2 histogram_1 + 4 histogram_2 + 8(histogram_3 + histogram_4)$$

$$repf\_motion = histogram_1 + 2 histogram_2 + 4 histogram_3 + 8 histogram_4.$$

The variable, repf_motion is used to determine if the two fields, in which the field differences are computed, correspond to repeat fields. If the repf_motion is greater than a programmable threshold, then it is implied that this really cannot be a repeat field.

Figure 4:
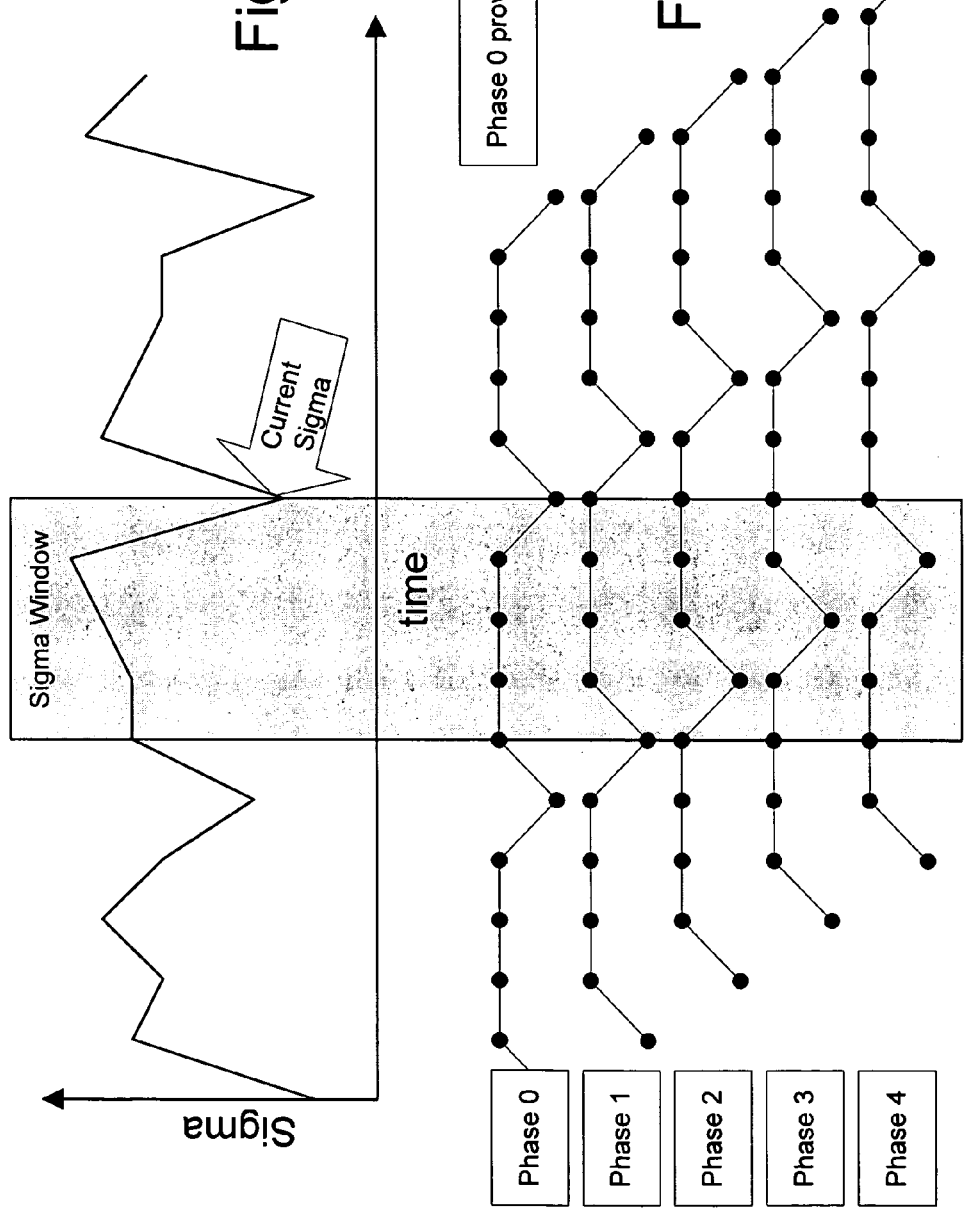
FIG. 4A illustrates an exemplary variation of sigma over time as may be calculated by the PLD in accordance with various aspects of the invention.
FIG. 4B illustrates the five possible field phase patterns that may be used for correlating with the graph of sigma shown in FIG. 4A, in accordance with various aspects of the invention.

FIG. 4A illustrates an exemplary variation of sigma over time as may be calculated by the PLD in accordance with various aspects of the invention. As illustrated, a pull-down field or repeat field may be associated with dips or low points of the graph of sigma. In this graphical embodiment, the dips occur periodically.

FIG. 4B illustrates the five possible field phase patterns that may be used for correlating with the graph of sigma shown in FIG. 4A, in accordance with various aspects of the invention. The five different patterns represent a base field phase pattern that is sequentially time shifted to form the other four field phase patterns. The base field phase pattern may represent a graph or pattern comprising five points, of which one point has a first value and the other four points have a second value. In the example shown, the pattern repeats itself with a periodicity of five. In the embodiment illustrated, the field phase pattern labeled "phase 0" is used to identify and phase lock (or synchronize) to the 3:2 pull-down video. In various aspects of the invention, a comparison or correlation of the one or more sigma values generated by the PLD with the five different time-shifted field phase patterns may provide a means to phase lock or synchronize to the 3:2 pull-down video. In one embodiment, the shape of the characteristic dip in sigma (indicative of 3:2 pull-down field) may be used to synchronize the PLD using one of the possible five field phase patterns. In one embodiment, the one of the possible five field phase patterns used to synchronize the PLD comprises the "phase 0" field phase pattern.

Figure 5:
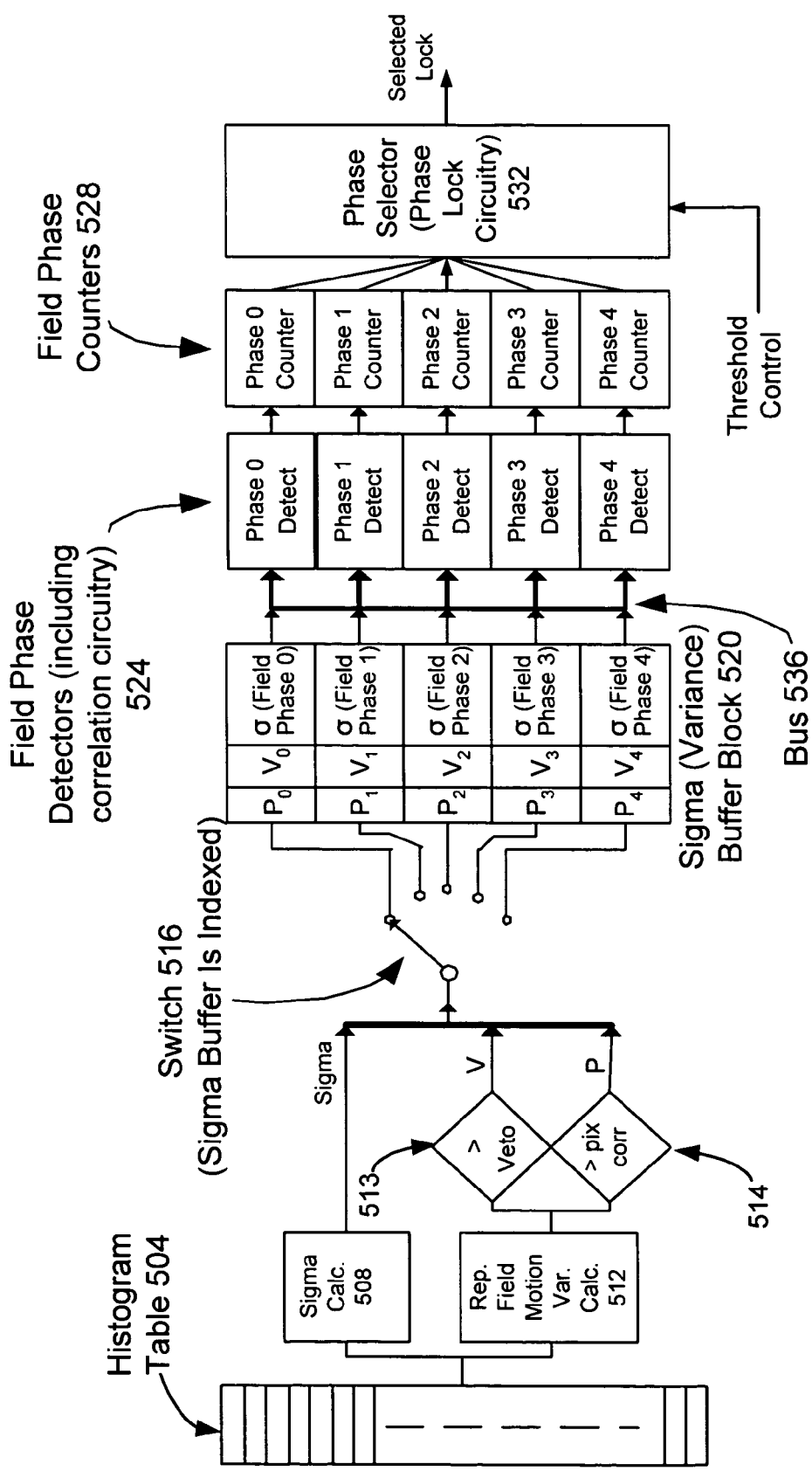
FIG. 5 is a block diagram of a system used to implement a 3:2 phase lock detector (PLD) in accordance with an embodiment of the invention.

FIG. 5 is a block diagram of a system used to implement a 3:2 phase lock detector (PLD) in accordance with an embodiment of the invention. The PLD comprises a histogram table 504, a sigma (or variance) calculator 508, a repeat field motion variance calculator 512, a veto circuitry 513, a pixel correction circuitry 514, a switch 516, a sigma (variance) buffer block 520, a set of five field phase detectors (field phase detector circuitry) 524, a set of five field phase counters 528, a phase selector 532, and a bus 536. In one embodiment, the histogram table is implemented using a memory such as a random access memory. The histogram table stores the one or more bins (e.g., the 64 bins previously described) used to calculate sigma. In one embodiment, the sigma 508 or repeat field motion variance calculator 512 may be implemented using logic circuitry. As previously mentioned, the sigma calculator 508 may incorporate and utilize the equation for sigma previously mentioned. The repeat field motion variance calculator 512, as defined later, computes a variance measure of a possible repeat field or 3:2 pull-down field. In one embodiment, the switch 516 may comprise an electronic switch capable of switching to one of five positions, as shown. The switch 516 facilitates transfer of the calculated values for sigma into the appropriate buffer location in the sigma buffer block 520. In one embodiment, the sigma buffer block 520 may be implemented using any type of memory or logic circuitry capable of storing five sigma values, as shown. The veto circuitry 513 and pixel correction circuitry 514 generate one or more indicators or flags that signify that the repeat field motion variance exceeds one or more (programmable) thresholds. These indicators, indicated by the variables P and V, are stored as shown in the sigma buffer block 520. For example, as each of the sigma values is written in to the sigma buffer block 520, repf_motion (i.e., a value indicating the amount of repeat field motion) is compared against a programmable veto threshold. If the repf_motion is greater than the veto threshold, then it indicates that its associated pull-down field cannot be a repeat field. When this occurs, a veto bit, represented by V, is appropriately set in the sigma buffer block 520. If this value is set, its corresponding field phase counter is set to zero and not allowed to increment. As a consequence, its phase is vetoed, and it cannot achieve phase lock. If the PLD was locked before this point in time, once this threshold is exceeded, its corresponding lock is removed. The phase veto is activated until the sigma value for this phase is updated (five fields later). If the newly measured value for repf_motion is lower than the veto threshold, the phase veto is removed and the counter for this phase is allowed to increment.

In one embodiment, the set of five phase detectors 524 comprises logic circuitry that incorporates the calculation or correlation of the sigma values using Pearson's correlation. A counter of the one or more of the five phase counters 528 are incremented when a particular field phase provides a correlation that is greater than a first (programmable) threshold. If the correlation provides a value that is less than the first threshold, the one or more phase counters 528 are decremented. If the value of one or more phase counters 528 increases beyond a second (programmable) threshold, it triggers a corresponding phase lock. Should a phase counter continue to increase, it reaches a saturation point above the second threshold. After a particular field phase counter initiates a phase lock, the PLD will lock onto the locked phase until it decreases beyond a third (programmable) threshold, at which the field phase becomes unlocked. The counter may decrease until it reaches a value of zero. The phase counters 528 may be examined to determine which, if any counters 528 are locked to a particular phase. In an embodiment in which more than one phase is locked onto, then the field phase that was first locked onto is selected as the actual locked field phase. In one embodiment, the phase selector 532 comprises logic circuitry that selects or locks onto a particular field phase as determined by the outputs of each of the five phase counters 528. The bus 536 is used to transmit, in parallel, a set of sigma buffer values (e.g., $x_0$, $x_1$, $x_2$, $x_3$, and $x_4$) from the sigma buffer block 520 to the phase detectors 524. Each of the phase detectors 524 performs a Pearson's correlation using the current sigma vector ($x_0$, $x_1$, $x_2$, $x_3$, $x_4$) during each field processing period. The functions and/or operations illustrated in the embodiment of FIG. 5 may be implemented using circuitry such as any type of logic circuitry. In an alternate embodiment, it is contemplated that the functions and/or operations illustrated in the system block diagram of the 3:2 phase lock detector (PLD), as illustrated in FIG. 5, may be implemented using software. The software may be executed by a central processing unit (CPU) that computes all necessary functions and/or operations required by the PLD.

In order to generate a field phase lock on one of the five possible field phase patterns, a history of the five previous sigma values is stored in the sigma buffer block 520. Initially all sigma values are set to zero. Once the first sigma value is calculated, it overwrites the value currently in the 0th buffer position of the sigma buffer block 520. In the next field period or field sample clock, the next value of sigma is calculated and is stored in the 1st position. In the next field period, the $2^{nd}$ position, is overwritten, and so forth and so on, through the $4^{th}$ position. The process then reverts back to the 0th position, in which a newly calculated sigma value is overwritten over the last value. This means that a new sigma value is written into the appropriate field phase entry of the sigma buffer block 520 after every field period or field sample clock. After every fifth field, all five sigma buffer locations within the sigma buffer block 520 will have been replaced with new values.

The phase detection process uses Pearson's correlation. Each of the phase field patterns comprises 4 points having value equal to one and a $5^{th}$ point having value equal to zero. Each of the phase detectors 524 shown in FIG. 5 is configured to determine if the point having zero value is currently being indexed. By way of Pearson's correlation, the sigma inputs indicate whether the point having zero value is currently indexed at its corresponding phase detector. In general, Pearson's correlation provides an output between the range (−1 and 1), regardless of the amplitude of the input signal.

The Pearson correlation is given below by the following equation:

$$r = \frac{n(\sum XY) - (\sum X)(\sum Y)}{\sqrt{[n\sum X^2 - (\sum X)^2][n\sum Y^2 - (\sum Y)^2]}} \quad \text{(Equation 1)}$$

The equation may be simplified by defining a vector X to represent a data set of sigma values and the vector Y to represent the data set for the particular phase pattern we are trying to correlate using Pearson's correlation. The subscripts in the following vectors correspond to the field phase locations within the sigma buffer block 520:

$$X=[x_0 x_1 x_2 x_3 x_4], Y=[y_0 y_1 y_2 y_3 y_4]$$

For example, one may select the following pattern of 1's and 0's for Y when correlating for field phase 1: Y=[1 0 1 1 1]. Notice that for field phase 1, the zero value is located in the second entry, associated with field phase 1. The entries for field phase 0, and field phases 2-4 each have value 1.

Regardless of the particular phase currently being computed, Y is such that the following holds:

$$n = 5, \sum Y = 4, \sum Y^2 = 4, \left(\sum Y\right)^2 = 16$$

Substituting the above values into Equation 1, $$r = \frac{5\left(\sum XY\right) - 4\left(\sum X\right)}{2\sqrt{[5\sum X^2 - (\sum X)^2]}} \quad \text{(Equation 2)}$$

It may be noted that $$\sum XY = \sum X - x_n$$

where the particular value of n corresponds to the position of the value 0 in the vector Y. In the example of Y above, this corresponds to the $y_1$ position in vector Y. Pearson's correlation coefficient may be further reduced to the following equation:

$$r = \frac{\sum X - 5x_n}{2\sqrt{[5\sum X^2 - (\sum X)^2]}} \quad \text{(Equation 3)}$$

Implementation of Pearson's correlation is computationally expensive, and requires high bit precision. A simplification to Pearson's correlation replaces the denominator with a different estimate of variance of (X), using [Max(X)–Min(X)] instead. The change to the correlation coefficient equation must also be accompanied with an adjustment of the thresholds, as the Max-Min approach has a non-linear relationship to Pearson's correlation coefficient, r, when r is a large value. With the threshold adjustment, the resulting correlation correctly estimates the original correlation within a 90% confidence interval of +/−0.06 around r=0.5, and within a 90% confidence interval of +/−0.036 around r=0.9. The accuracy of this approximation increases with higher values of r. The approximation of Pearson's correlation coefficient may be represented by the following equation:

$$r \approx \frac{\sum X - 5x_n}{8[\text{Max}(X \notin x_n) - \text{Min}(X \notin x_n)]} \quad \text{(Equation 4)}$$

An example uses the definition of the match filter below, where $x_0$-$x_4$ are the sigma values from the histogram bins of five fields, and $y_0$-$y_4$ are the match filter coefficients 0 or 1.

The numerator of equation 4 would simply be equal to $(x_0+x_2+x_3+x_4-4*x_1)$, while the denominator would be equal to $8*(\text{Max}(x_{0234})-\text{Min}(x_{0234}))$. Note that element $x_1$ is not included in Max or Min.

Figure 6:
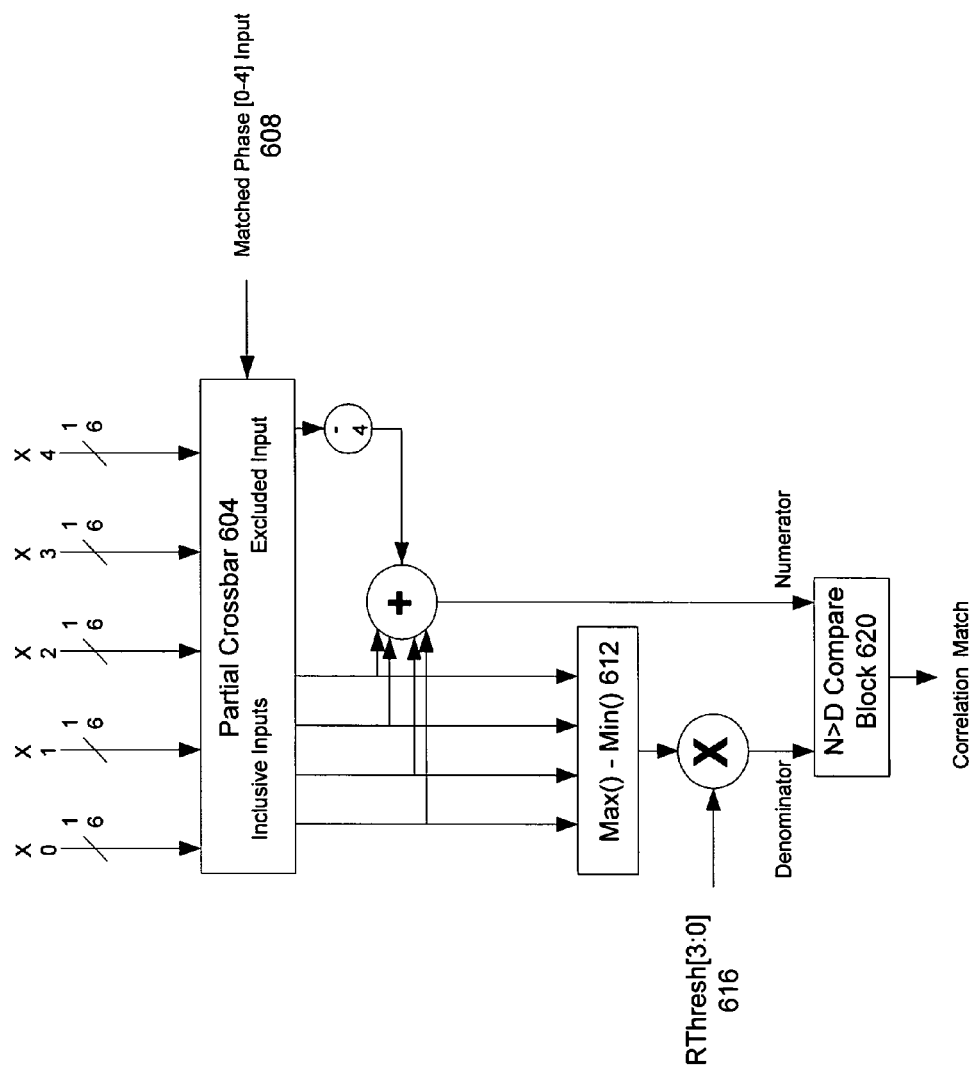
FIG. 6 is a block diagram of an exemplary implementation of Pearson's correlation using a match filter, in accordance with an embodiment of the invention.

FIG. 6 is a block diagram of an exemplary implementation of Pearson's correlation using a match filter, in accordance with an embodiment of the invention. The match filter comprises circuitry such as digital logic circuitry. In one embodiment, the exemplary match filter with threshold may be used to determine if the sigma associated with a particular field phase correlates sufficiently well enough to increment one or more phase counters located within the PLD. In one embodiment, the match filter is implemented using the following numbered components, as illustrated in FIG. 6:

1) Partial Crossbar Block 604: In the diagram referenced in FIG. 6, the partial crossbar 604 selects one of the 5 inputs based on the matched phase. The matched phase corresponds to Yn=0 in the match filter equation. The match phase input 608 selects the phase, which may be one of 5 phases. The selected Xn value for the matched phase is sent to the excluded input of the crossbar, while the remaining 4 Xn's are sent to the inclusive inputs of the crossbar.

2) Max( )–Min( ) Block 612: The included inputs are sent to the Max( )–Min( ) block 612 which computes the maximum value of the four inputs and subtracts the minimum value of the four inputs. The output is always a positive value.

Rthresh Multiply Component 616: The only user parameter in the match filter is the threshold multiplier. Different values of Rthresh may be selected by the user software to indicate a more sensitive or more selective match filter. Larger values correspond to more selective match filter. A more selective match filter requires a stronger 3:2 pull-down cadence in order to lock onto the signal.

N>D Compare Block 620: The N>D compare block uses 2's complement arithmetic, since the numerator may be a negative value. The result of the comparison indicates if a match filter correlation has exceeded a particular threshold value. The output is a single bit signal, match=1. Note that if N–D=0, the match output=0.

As shown in FIG. 6, the inputs X0-X4 are sigma value inputs generated from an exemplary histogram over the last 5 field periods. As previously defined, sigma=$\text{bin}_1$+2($\text{bin}_2$+$\text{bin}_3$)+4($\text{bin}_{4567}$)+8($\text{bin}_{8-64}$). Note, the actual hardware does not require 64 bins of storage, as it may be accomplished using 4 buckets of a size equal to the summed bins mentioned above. Rthresh is the correlation threshold provided by way of input from a user.

Referring back to FIG. 5, each phase detector and its corresponding phase counter is effectively looking for the repeat field at its location in the sigma table. As diagrammed in FIG. 1, by definition, the repeat field is labeled field phase 0. When the switch (e.g., sigma buffer index) points to a field phase corresponding to a locked position, the field phase is referenced to be at field phase 0. It will point to the same sigma field position in the sigma buffer in five field periods, and again the field phase will be referenced at field phase 0. In the intervening four fields, the field phase will count from 1 through 4 for each field. The current field phase may be determined directly from the switch position (e.g., sigma buffer index) and the selected lock position, as illustrated below in Table 1. The distance (modulo 5) between the current sigma buffer index (as referenced in FIG. 5) and the current locked position provides the current field phase. For example, if the phase selector locks onto field phase #1 and the current sigma buffer index is positioned at position #3 of the sigma buffer, then the actual field phase, as is shown in Table 1, is 2. If, instead, the current sigma table buffer index is positioned at position #0 of the sigma buffer, the current field phase would be field phase 4.

TABLE 1

Current field phase determined from selected lock
position and current sigma buffer index

| Current Buffer Index | Selected Lock Position | | | | |
|---|---|---|---|---|---|
| | 0 | 1 | 2 | 3 | 4 |
| 0 | 0 | 4 | 3 | 2 | 1 |
| 1 | 1 | 0 | 4 | 3 | 2 |
| 2 | 2 | 1 | 0 | 4 | 3 |
| 3 | 3 | 2 | 1 | 0 | 4 |
| 4 | 4 | 3 | 2 | 1 | 0 |

The PLD shown in FIG. 5 is capable of determining whether a particular field phase selected may be incorrect when the variance or sigma is large, for example. This occurs, for example, when there is significant unexpected motion detected between fields. The PLD may identify such an irregularity and initiate what is termed a phase veto. If all the sigma values are very high due to a large amount of motion but one coincidently is repeatedly, (e.g, every five fields) a little smaller than the others, then the lock circuit may pick up the pattern and proceed to erroneously lock onto it, if the veto circuitry, as referenced in FIG. 5, were not implemented.

Each of the five sigma buffer positions is associated with the expected field phase of the repeat field, were it to be that field phase that it locks onto. This implies that, for example, if we are locked to field phase 1, then every time it is the turn to overwrite sigma table index 1, we would expect to see a small value for sigma, since this will be the repeat or pull-down field. It is further contemplated that the various aspects of the embodiment of 3:2 PLD illustrated in FIG. 5, as well as the methods described herein, may be adapted for other types of pull-down video.

FIG. 7A is a block diagram that comprises an inverse telecine system 700 in accordance with an embodiment of the invention. The inverse telecine system 700 implements inverse telecine operations in accordance with an embodiment of the invention. The inverse telecine system 700 comprises a field phase calculation block 704. The field phase calculation block 704 comprises the 3:2 phase lock detector (PLD) as previously described in relation to FIG. 5. In one embodiment, the inverse telecine system 700 allows detection of either a 3:2 or 2:2 pull-down and provides the correct control to a pixel processing block to facilitate either reverse 3:2 or reverse 2:2 processing. In one embodiment, the hardware detects and provides the one or more appropriate signals for processing a reverse 3:2 pull-down. As illustrated, exemplary inputs to the field phase calculation block 704 include an inverse telecine control signal, a histogram data signal, and a frame unexpected motion signal. Exemplary outputs from the field phase calculation block 704 include a field phase output signal, a locked status signal (indicating the locked field phase), and an unexpected motion control signal.

FIG. 7B is a block diagram that comprises an alternate inverse telecine system 708, in accordance with an embodiment of the invention. The alternate embodiment provided in FIG. 7B may substitute the embodiment illustrated in FIG. 7A. In this embodiment, a central processing unit (CPU) 712 may be used to implement the 3:2 phase lock detector. The embodiment of FIG. 7B may be used to operationally perform a 3:2 or potentially a 2:2 reverse pull-down. In one embodiment, the alternate inverse telecine system 708 comprises a CPU 712 and a memory 716. The CPU 712 may execute instructions contained in the memory 716 by way of reading from and writing into the memory 716. In one embodiment, the pipelining of inputs and outputs to the alternate inverse telecine system 708 ensures that the CPU 712 has sufficient time in which to perform its tasks.

With respect to repf_motion, as was previously described, a measure of the amount of motion in the repeat field is given by the following repeat field motion variance equation:

$$repf\_motion = (bin_2 + bin_3) + 2(bin_4 + bin_5 + bin_6 + bin_7) + 4\sum_{n=8}^{15} bin_n + 8\sum_{n=16}^{63} bin_n$$

Note that bin0 (absolute difference values between 0 and 3) and bin1 (absolute difference values between 4 and 7) are not used in the repeat field motion variance equation. This equation is very similar to the equation for sigma except that it is weighted more towards large measured absolute differences rather than smaller absolute differences. It is weighted in this fashion in order to obviate the inclusion of noise components that are usually included in bin0 and bin1.

As each of the sigma values is written into the sigma buffer, a repeated field motion variance value is compared against a programmable veto threshold. If the repf_motion value is greater than the threshold then it is determined that the field phase that is being indexed by the switch cannot be a repeat field. There is simply too much unexpected motion, as determined by the repeat field motion variance calculation. In the event of such an occurrence, a corresponding veto bit is set in association with the sigma value in the sigma buffer, referring back to FIG. 5. When this veto is set, the corresponding counter for the indexed field phase is set to zero and not allowed to increment. While this veto is set, the PLD cannot achieve phase lock for the indexed field phase. If the PLD was locked onto a particular field phase, the lock is removed when this programmable veto threshold is exceeded. The veto remains active until the phase is updated (which occurs five fields later). Again, the newly calculated value for repf_motion is compared against the programmable veto threshold. Should the value for repf_motion be lower, the phase veto is removed and the counter for this phase is allowed to increment.

Figure 8A:
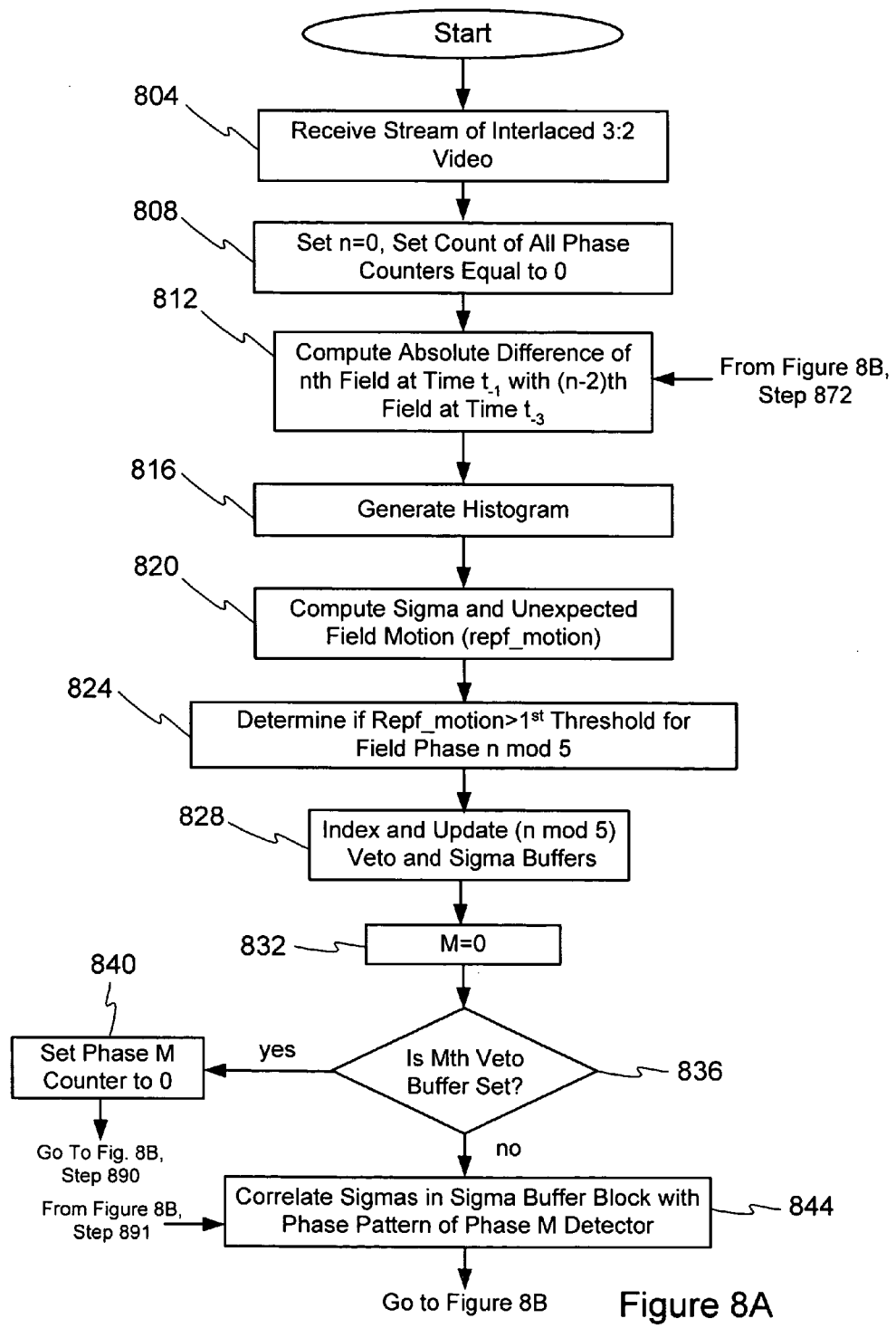
FIGS. 8a and 8b are operational flow diagrams illustrating the operation of the 3:2 phase lock detector (PLD) in accordance with an embodiment of the invention.
Figure 8B:
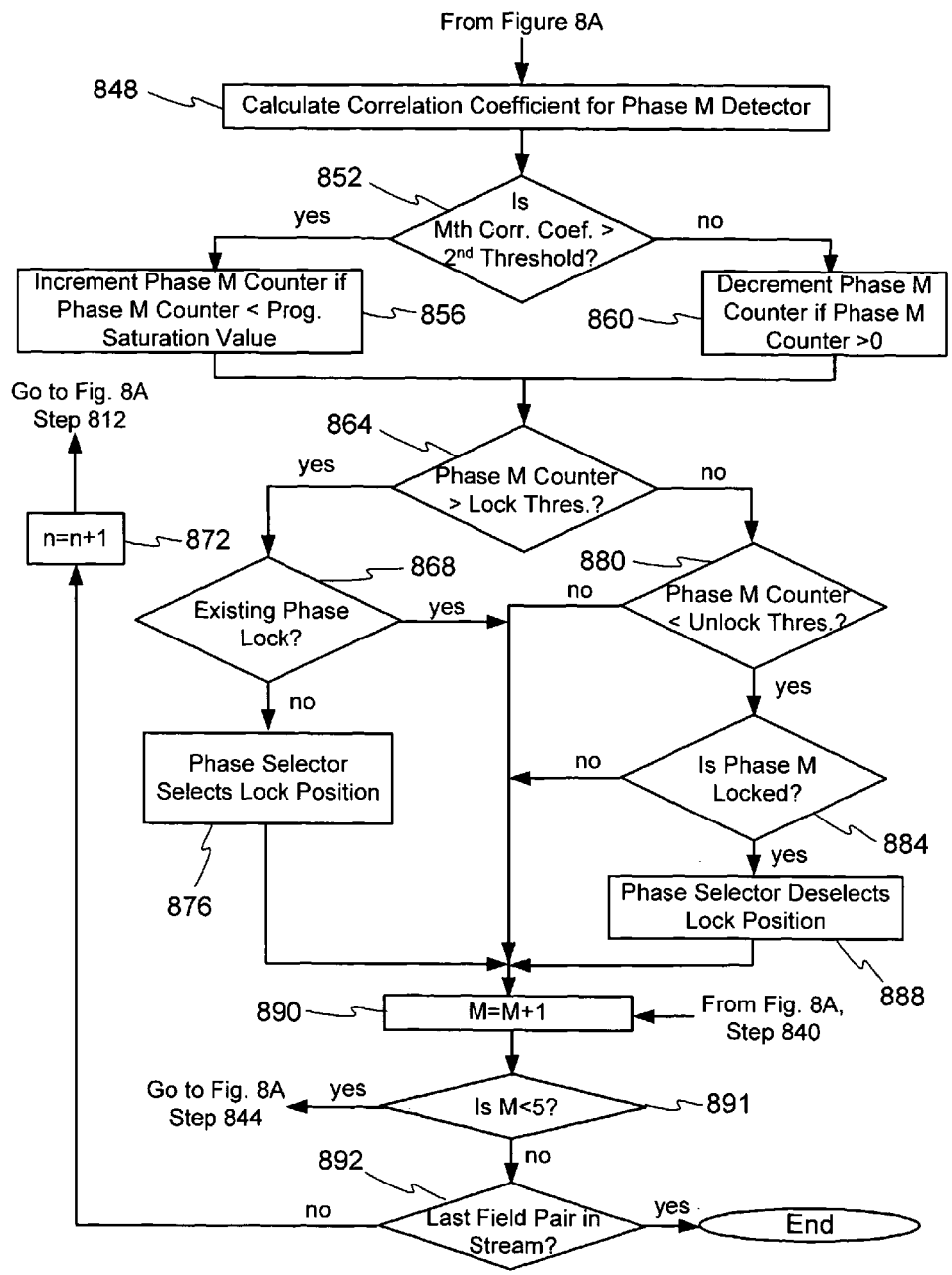

FIGS. 8a and 8b are operational flow diagrams illustrating the operation of the 3:2 phase lock detector (PLD) in accordance with an embodiment of the invention. At step 804, a stream of interlaced 3:2 video is received by the 3:2 phase lock detector (PLD). At step 808, the field phase count or number, n, is reset to zero. In addition, all phase counters of the PLD are reset to zero. Next, at step 812, absolute differences of corresponding pixels are computed between two fields of the received interlaced 3:2 video. The first field is temporally identified as an nth field that is received at time $t_{-1}$ while the second field is temporally identified as an (n−2)th field that is received at time $t_{-3}$. In essence, the two fields are two time periods apart (i.e., the fields are separated by one field). The absolute differences are computed between the pixels of the two fields. These absolute differences are used to generate a histogram as indicated at step 816. At step 820, the histogram is used to compute values for sigma and unexpected field motion between the two fields. The unexpected motion is also represented by the parameter, repf_motion and was defined earlier. At step 824, it is determined whether repf_motion is greater than a first threshold value. If repf_motion is greater than the first threshold value, then a veto is set in buffer memory of the PLD. The first threshold value may be programmable by way of logic circuitry. The process proceeds with step 828, at which, a veto indicator is set to a particular value (e.g., a logical high value) in a memory location (e.g., for field phase (n mod5)) within the sigma buffer block of the PLD, signifying that the repf_motion value is greater than the first threshold. In addition, the sigma value associated with the field difference is computed and stored in a corresponding location within the sigma buffer block of the PLD, as may be referenced in FIG. 5. Next, at step 832, a variable M is reset and used as a counter for sequentially indexing each of five phase detectors and/or phase counters. At step 836 an assessment is made whether the Mth veto indicator or buffer is set. If, at step 836, the Mth veto indicator is set (i.e., its value is set high within a corresponding memory location within the sigma buffer block shown in FIG. 5), then its associated phase M counter is reset to zero, as shown in step 840. Thereafter, the process proceeds to step 890 of FIG. 8B, as will be discussed hereafter. The appropriate sigma buffer memory location (i.e., the (nmod5) the sigma buffer) in the sigma buffer block is indexed using the switch, as previously referenced in FIG. 5. Each of five correlation coefficients (i.e., determined as M varies from 0 to 4) are calculated based on the value of sigma that is calculated at step 820. At step 844, the sigma buffers provide parallel outputs to the phase M detector such that the received sigma values are correlated against a unique field phase pattern associated with each of the phase M detectors. The correlation function, for example, may comprise Pearson's correlation function. In one embodiment, the field phase pattern at the phase M detector comprises a pattern of five values, four of which have magnitude or value equal to 1, and one of which has a magnitude or value equal to 0. In one embodiment, the field phase pattern may be time shifted by a single field period between the phase M detector and the phase (M+1) detector. At step 848, the output of the correlation results in a correlation coefficient for the phase M detector. Then, at step 852, the Mth correlation coefficient (corresponding to the phase M detector) is compared to a second threshold value. If the Mth correlation coefficient is greater than the second threshold, its associated phase M counter is incremented by one at step 856, if the phase M counter is less than a saturation value. In one embodiment, the saturation value may comprise a value that is programmed. Otherwise, its associated phase M counter is decremented by one at step 860, if the phase M counter is greater than zero. In one or more other embodiments, the phase M counter may be decremented if the Mth correlation coefficient reaches another threshold (e.g., a threshold lower than that of the second threshold). At step 864, an assessment is made whether the phase M counter is greater than a phase lock threshold value. If the phase M counter is greater than the phase lock threshold, the process proceeds to step 868, at which an assessment is made whether an existing phase lock exists. If an existing phase lock exists, the existing phase lock is maintained, and the process proceeds to step 890 at which M is incremented by one. At step 891, an assessment is made whether M is less than the value five. If M is less than the value five, not all five correlation coefficients have been evaluated for the computed sigma, and the process reverts back to step 844 of FIG. 8A. Otherwise, at step 892, an assessment is made whether the field pair used to generate sigma corresponds to the last field pair to be analyzed in the video stream. If the field pair used is not the last field pair, the process proceeds to step 872, at which n is incremented by one, and then the process jumps to step 812 in FIG. 8A. If the field pair used is the last field pair in the stream, the process ends. If at step 868, on the other hand, an existing phase lock does not exist, the process proceeds with step 876, at which the phase selector (or phase lock circuitry), selects field phase M as the selected locked position. The corresponding field phase may be identified as a pull-down field using Table 1, as described earlier. The process then proceeds with step 890, at which M is incremented by one. Then an assessment is made whether M is less than the value five, at step 891. If M is less than the value five, not all five correlation coefficients have been evaluated for the computed sigma, and the process reverts back to step 844 of FIG. 8A. Otherwise, at step 892, an assessment is made whether the field pair used to generate sigma corresponds to the last field pair to be analyzed in the video stream. If the field pair used is not the last field pair, the process proceeds to step 872, n is incremented by one, and then the process jumps to step 812 in FIG. 8A. If, at step 892, it is determined that the field pair used corresponds to the last field pair in the video stream, then the process ends. If, on the other hand, at step 864, the phase M counter is not greater than the phase lock threshold, the process proceeds with step 880. At step 880, an assessment is made whether the phase M counter is less than a phase unlock threshold. If, at step 880, the phase n counter is less than the phase unlock threshold, an assessment is made whether the corresponding phase M is locked, at step 884. If, at step 884, it is determined that phase M is locked, it becomes unlocked or deselected by the phase selector, at step 888. Thereafter, the process proceeds with step 890, at which M is incremented by one. At step 891, an assessment is made whether M is less than the value five. If M is less than the value five, not all five correlation coefficients have been evaluated for the computed sigma value, and the process reverts back to step 844 of FIG. 8A. Otherwise, at step 892, an assessment is made whether the field pair used to generate sigma corresponds to the last field pair to be analyzed in the video stream. If the field pair used is not the last field pair, the process proceeds to step 872, n is incremented by one, and then the process jumps to step 812 in FIG. 8A. Otherwise, the process ends. If, at step 880, the phase M counter is not less than the unlock threshold, then the process proceeds with step 890, at which M is incremented by one. Then, at step 891 an assessment is made whether M is less than five. If M is less than five, the process reverts back to step 844 of FIG. 8A. Otherwise, at step 892, an assessment is made whether the field pair used to generate sigma corresponds to the last field pair to be analyzed in the video stream. If the field pair used is not the last field pair, the process proceeds to step 872, n is incremented by one, and then the process jumps to step 812 in FIG. 8A. If, at step 892, it is determined that the field pair used corresponds to the last field pair in the video stream, then the process ends. If, at step 884, phase M is unlocked already, then the process simply continues with step 890, at which M is incremented by one. Then, at step 891, an assessment is made whether M is less than the value five. If M is less than the value five, not all five correlation coefficients have been evaluated for the computed sigma, and the process reverts back to step 844 of FIG. 8A. Otherwise, at step 892, an assessment is made whether the field pair used to generate sigma corresponds to the last field pair to be analyzed in the video stream. If the field pair used is not the last field pair, the process proceeds to step 872. At step 872, n is incremented by one, and then the process jumps to step 812 in FIG. 8A, at which an additional field pair (or pair of fields) may be processed. Otherwise, the process ends. In the one or more embodiments previously discussed, the one or more threshold values may be programmed by a user.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of identifying a pull-down field in a 3:2 pull-down video stream, comprising:
    generating one or more temporally sequential variances using said 3:2 pull-down video stream;
    correlating said one or more temporally sequential variances to one or more temporal variance patterns associated with said 3:2 pull-down video stream, each of said one or more temporal variance patterns associated with one or more unique field phases;
    generating one or more correlation coefficients associated with each of said one or more temporal variance patterns;
    assessing whether said one or more correlation coefficients exceeds a first threshold value;
    incrementing one or more counters associated with said one or more correlation coefficients if said one or more correlation coefficients exceeds said first threshold value;
    assessing whether said one or more correlation coefficients is less than a second threshold value;
    decrementing said one or more counters associated with said one or more correlation coefficients if said one or more correlation coefficients is less than said second threshold value;
    determining if a counter of said one or more counters exceeds a third threshold;
    selecting said one or more unique field phases as a repeat field phase if said counter exceeds said third threshold; and
    identifying said pull-down field associated with said repeat field phase.

2. The method of claim 1, wherein said first, said second, and said third threshold values are programmable.

3. The method of claim 1, wherein said one or more temporal variance patterns comprises a sequence of values.

4. The method of claim 3, wherein said sequence of values comprises four values having a magnitude of 1 and one value having a magnitude of zero.

5. The method of claim 1, wherein said generating said one or more temporally sequential variances comprises:
    determining absolute differences of corresponding pixels between one or more pairs of fields, said one or more pairs of fields temporally located two field periods apart within said 3:2 pull-down video stream;
    generating one or more histograms using said absolute differences, said one or more histograms comprising a number of bins; and
    first computing said one or more temporally sequential variances, each of said one or more sequential variances computed from a histogram of said one or more histograms, said histogram generated from a corresponding pair of fields of said one or more pairs of fields.

6. The method of claim 5, wherein said bins are equally sized.

7. The method of claim 5, wherein said one or more histograms comprises up to 64 bins.

8. The method of claim 7, wherein each of said 64 bins has size equal to 4.

9. The method of claim 5, wherein said one or more histograms comprises 5 bins.

10. The method of claim 5, wherein said first computing is performed using the equation $$sigma = bin_1 + 2(bin_2 + bin_3) + 4(bin_4 + bin_5 + bin_6 + bin_7) + 8\sum_{n=8}^{63} bin_n.$$

11. The method of claim 5, wherein said first computing is performed using the equation $$sigma = histogram_0 + 2histogram_1 + 4histogram_2 + 8(histogram_3 + histogram_4).$$

12. The method of claim 5, further comprising:
    second computing one or more parameters for each of said one or more pairs of fields; and
    resetting a counter of said one or more counters if said one or more parameters exceeds a fourth threshold.

13. The method of claim 12, wherein said fourth threshold value comprises a programmable threshold value.

14. The method of claim 12, wherein said resetting sets the count of said counter to zero.

15. The method of claim 12, further comprising storing an indicator or flag within a memory, said indicator or flag indicating when said one or more parameters exceeds said fourth threshold, said one or more parameters calculated or computed using the equation:

$$repf\_motion = (bin_2 + bin_3) + 2(bin_4 + bin_5 + bin_6 + bin_7) + 4\sum_{n=8}^{15} bin_n + 8\sum_{n=16}^{63} bin_n.$$

16. The method of claim 12, further comprising storing an indicator or flag within a memory, said indicator or flag indicating when said one or more parameters exceeds said fourth threshold, said one or more parameters calculated or computed using the equation:

$$repf\_motion = histogram_1 + 2histogram_2 + 4histogram_3 + 8histogram_4.$$

17. The method of claim 12, wherein said one or more parameters measures the unexpected field motion between said one or more pairs of fields.

18. The method of claim 17, wherein said unexpected field motion is defined by the equation:

$$repf\_motion = (bin_2 + bin_3) + 2(bin_4 + bin_5 + bin_6 + bin_7) + 4\sum_{n=8}^{15} bin_n + 8\sum_{n=16}^{63} bin_n.$$

19. The method of claim 17, wherein said unexpected field motion is defined by the equation:

$$repf\_motion = histogram_1 + 2histogram_2 + 4histogram_3 + 8histogram_4.$$

20. The method of claim 5, wherein the number of occurrences associated with said bins are implemented using one or more registers.

21. The method of claim 1, wherein said one or more temporally sequential variances comprises a set of five variances.

22. The method of claim 1, wherein said correlating is performed using Pearson's correlation.

23. The method of claim 1, wherein said first threshold value varies over the range −1 to +1.

24. A system comprising:
a processor; and
a memory, said processor capable of executing a set of instructions, said set of instructions causes the system to perform the steps comprising:
generating one or more temporally sequential variances using said 3:2 pull-down video stream;
correlating said one or more temporally sequential variances to one or more temporal variance patterns associated with said 3:2 pull-down video stream, each of said one or more temporal variance patterns associated with one or more unique field phases;
generating one or more correlation coefficients associated with each of said one or more temporal variance patterns;
assessing whether said one or more correlation coefficients exceeds a first threshold value;
incrementing one or more counters associated with said one or more correlation coefficients if said one or more correlation coefficients exceeds said first threshold value;
assessing whether said one or more correlation coefficients is less than a second threshold value;
decrementing said one or more counters associated with said one or more correlation coefficients if said one or more correlation coefficients is less than said second threshold value;
determining if a counter of said one or more counters exceeds a third threshold;
selecting said one or more unique field phases as a repeat field phase if said counter exceeds said third threshold; and
identifying said pull-down field associated with said repeat field phase.

25. The system of claim 24, wherein said first, said second, and said third threshold values are programmable.

26. The system of claim 24, wherein said one or more temporal variance patterns comprises a sequence of values.

27. The system of claim 26, wherein said sequence of values comprises four values having a magnitude of 1 and one value having a magnitude of zero.

28. The system of claim 24, wherein said generating said one or more temporally sequential variances comprises:
determining absolute differences of corresponding pixels between one or more pairs of fields, said one or more pairs of fields temporally located two field periods apart within said 3:2 pull-down video stream;
generating one or more histograms using said absolute differences, said one or more histograms comprising a number of bins; and
first computing said one or more temporally sequential variances, each of said one or more sequential variances computed from a histogram of said one or more histograms, said histogram generated from a corresponding pair of fields of said one or more pairs of fields.

29. The system of claim 28, wherein said bins are equally sized.

30. The system of claim 28, wherein said one or more histograms comprises up to 64 bins.

31. The system of claim 30, wherein each of said 64 bins has size equal to 4.

32. The system of claim 28, wherein said one or more histograms comprises 5 bins.

33. The system of claim 28, wherein said first computing is performed using the equation $$\text{sigma} = bin_1 + 2(bin_2 + bin_3) + 4(bin_4 + bin_5 + bin_6 + bin_7) + 8\sum_{n=8}^{63} bin_n.$$

34. The system of claim 28, wherein said first computing is performed using the equation $$\text{sigma} = \text{histogram}_0 + 2\text{histogram}_1 + 4\text{histogram}_2 + 8(\text{histogram}_3 + \text{histogram}_4).$$

35. The system of claim 28, wherein said steps further comprises:
second computing one or more parameters for each of said one or more pairs of fields; and
resetting a counter of said one or more counters if said one or more parameters exceeds a fourth threshold.

36. The system of claim 35, wherein said fourth threshold value comprises a programmable threshold value.

37. The system of claim 35, wherein said resetting sets the value of said counter to zero.

38. The system of claim 35, wherein said steps further comprises storing an indicator or flag within a memory, said indicator or flag indicating when said one or more parameters exceeds said fourth threshold, said one or more parameters calculated or computed using the equation:

$$\text{repf\_motion} = (bin_2 + bin_3) + 2(bin_4 + bin_5 + bin_6 + bin_7) + 4\sum_{n=8}^{15} bin_n + 8\sum_{n=16}^{63} bin_n.$$

39. The system of claim 35, wherein said steps further comprises storing an indicator or flag within a memory, said indicator or flag indicating when said one or more parameters exceeds said fourth threshold, said one or more parameters calculated or computed using the equation:

$$\text{repf\_motion} = \text{histogram}_1 + 2\text{histogram}_2 + 4\text{histogram}_3 + 8\text{histogram}_4.$$

40. The system of claim 35, wherein said one or more parameters measures the unexpected field motion between said one or more pairs of fields.

41. The system of claim 40, wherein said unexpected field motion is defined by the equation:

$$\text{repf\_motion} = (bin_2 + bin_3) + 2(bin_4 + bin_5 + bin_6 + bin_7) + 4\sum_{n=8}^{15} bin_n + 8\sum_{n=16}^{63} bin_n.$$

42. The system of claim 40, wherein said unexpected field motion is defined by the equation:

$$\text{repf\_motion} = \text{histogram}_1 + 2\text{histogram}_2 + 4\text{histogram}_3 + 8\text{histogram}_4.$$

43. The system of claim 28, wherein the number of occurrences associated with said bins are implemented using one or more registers.

44. The system of claim 24, wherein said one or more temporally sequential variances comprises a set of five variances.

45. The system of claim 24, wherein said correlating is performed using Pearson's correlation.

46. The system of claim 24, wherein said first threshold value varies over the range −1 to +1.

47. A system comprising:
one or more circuits operable for, at least:
generating one or more temporally sequential variances using said 3:2 pull-down video stream;
correlating said one or more temporally sequential variances to one or more temporal variance patterns associated with said 3:2 pull-down video stream, each of said one or more temporal variance patterns associated with one or more unique field phases;
generating one or more correlation coefficients associated with each of said one or more temporal variance patterns;
assessing whether said one or more correlation coefficients exceeds a first threshold value;
incrementing one or more counters associated with said one or more correlation coefficients if said one or more correlation coefficients exceeds said first threshold value;
assessing whether said one or more correlation coefficients is less than a second threshold value;
decrementing said one or more counters associated with said one or more correlation coefficients if said one or more correlation coefficients is less than said second threshold value;
determining if a counter of said one or more counters exceeds a third threshold;
selecting said one or more unique field phases as a repeat field phase if said counter exceeds said third threshold; and
identifying said pull-down field associated with said repeat field phase.

48. The system of claim 47, wherein said first, said second, and said third threshold values are programmable.

49. The system of claim 47, wherein said one or more temporal variance patterns comprises a sequence of values.

50. The system of claim 49, wherein said sequence of values comprises four values having a magnitude of 1 and one value having a magnitude of zero.

51. The system of claim 47, wherein said generating said one or more temporally sequential variances comprises:
determining absolute differences of corresponding pixels between one or more pairs of fields, said one or more pairs of fields temporally located two field periods apart within said 3:2 pull-down video stream;
generating one or more histograms using said absolute differences, said one or more histograms comprising a number of bins; and
first computing said one or more temporally sequential variances, each of said one or more sequential variances computed from a histogram of said one or more histograms, said histogram generated from a corresponding pair of fields of said one or more pairs of fields.

52. The system of claim 51, wherein said bins are equally sized.

53. The system of claim 51, wherein said one or more histograms comprises up to 64 bins.

54. The system of claim 53, wherein each of said 64 bins has size equal to 4.

55. The system of claim 51, wherein said one or more histograms comprises 5 bins.

56. The system of claim 51, wherein said first computing is performed using the equation $$\text{sigma} = bin_1 + 2(bin_2 + bin_3) + 4(bin_4 + bin_5 + bin_6 + bin_7) + 8\sum_{n=8}^{63} bin_n.$$

57. The system of claim 51, wherein said first computing is performed using the equation $$\text{sigma} = histogram_0 + 2histogram_1 + 4histogram_2 + 8(histogram_3 + histogram_4).$$

58. The system of claim 51, wherein said one or more circuits is further operable for, at least:
second computing one or more parameters for each of said one or more pairs of fields; and
resetting a counter of said one or more counters if said one or more parameters exceeds a fourth threshold.

59. The system of claim 58, wherein said fourth threshold value comprises a programmable threshold value.

60. The system of claim 58, wherein said resetting sets the value of said counter to zero.

61. The system of claim 58, wherein said one or more circuits is further operable for, at least:
storing an indicator or flag within a memory, said indicator or flag indicating when said one or more parameters exceeds said fourth threshold, said one or more parameters calculated or computed using the equation:

$$\text{repf\_motion} = (bin_2 + bin_3) + 2(bin_4 + bin_5 + bin_6 + bin_7) + 4\sum_{n=8}^{15} bin_n + 8\sum_{n=16}^{63} bin_n.$$

62. The system of claim 58, wherein said one or more circuits is further operable for, at least:
storing an indicator or flag within a memory, said indicator or flag indicating when said one or more parameters exceeds said fourth threshold, said one or more parameters calculated or computed using the equation:

$$\text{repf\_motion} = histogram_1 + 2histogram_2 + 4histogram_3 + 8histogram_4.$$

63. The system of claim 58, wherein said one or more parameters measures the unexpected field motion between said one or more pairs of fields.

64. The system of claim 63, wherein said unexpected field motion is defined by the equation:

$$\text{repf\_motion} = (bin_2 + bin_3) + 2(bin_4 + bin_5 + bin_6 + bin_7) + 4\sum_{n=8}^{15} bin_n + 8\sum_{n=16}^{63} bin_n.$$

65. The system of claim 63, wherein said unexpected field motion is defined by the equation:

$$\text{repf\_motion} = histogram_1 + 2histogram_2 + 4histogram_3 + 8histogram_4.$$

66. The system of claim 51, wherein the number of occurrences associated with said bins are implemented using one or more registers.

67. The system of claim 47, wherein said one or more temporally sequential variances comprises a set of five variances.

68. The system of claim 47, wherein said correlating is performed using Pearson's correlation.

69. The system of claim 47, wherein said first threshold value varies over the range −1 to +1.

* * * * *